US010037854B2

United States Patent
Nieva Fatela et al.

(10) Patent No.: US 10,037,854 B2
(45) Date of Patent: Jul. 31, 2018

(54) ENERGY ACCUMULATION BASKET

(71) Applicant: CAF POWER & AUTOMATION, S.L.U., San Sebastián (Guipuzcoa) (ES)

(72) Inventors: Txomin Nieva Fatela, San Sebastián (ES); Ion Onandia Jove, San Sebastián (ES); Xabier Aguirre Viana, San Sebastián (ES); Jose Miguel Astinza, San Sebastián (ES)

(73) Assignee: CAF POWER & AUTOMATION, S.L.U., San Sebastian (Guipuzcoa) (ES)

( * ) Notice: Subject to any disclaimer, the term of this patent is extended or adjusted under 35 U.S.C. 154(b) by 166 days.

(21) Appl. No.: 15/026,456

(22) PCT Filed: Oct. 3, 2014

(86) PCT No.: PCT/ES2014/070754
§ 371 (c)(1),
(2) Date: Mar. 31, 2016

(87) PCT Pub. No.: WO2015/049407
PCT Pub. Date: Apr. 9, 2015

(65) Prior Publication Data
US 2016/0247634 A1 Aug. 25, 2016

(30) Foreign Application Priority Data
Oct. 3, 2013 (ES) .................... 201331452

(51) Int. Cl.
*H01G 11/10* (2013.01)
*H01G 11/82* (2013.01)
(Continued)

(52) U.S. Cl.
CPC .............. *H01G 11/10* (2013.01); *H01G 2/04* (2013.01); *H01G 11/76* (2013.01); *H01G 11/82* (2013.01);
(Continued)

(58) Field of Classification Search
CPC ........ H01G 11/26; H01G 11/34; H01G 11/04; H01G 11/28; H01G 11/32; H01G 11/66; H01G 11/86; H01G 11/10
See application file for complete search history.

(56) References Cited

U.S. PATENT DOCUMENTS 6,333,091 B1    12/2001  Kasugai et al.
7,027,290 B1 *   4/2006  Thrap ...................... H01G 2/14
                                                         361/274.2
(Continued)

FOREIGN PATENT DOCUMENTS

ES    2372454 A1    1/2012

OTHER PUBLICATIONS

Translation of Written Opinion for PCT/ES2014/070754.
International Search Report for International Application No. PCT/ES2014/070754, (dated Jan. 2, 2015)(4 pages).

*Primary Examiner* — Nguyen Ha
(74) *Attorney, Agent, or Firm* — Lucas & Mercanti, LLP (57) ABSTRACT

The present invention relates to an energy accumulation basket, formed by holders provided with multiple housings where there are arranged capacitors held by their ends between holders, the inner walls of the housings having indentations where respective accessory elastic projections are housed, whereby capacitors arranged in the housings fit within the perimeter, and where conformations are defined on the outer face of each holder, said conformations protruding into the housings for supporting the end of the corresponding capacitor, the capacitors being axially retained in the respective housings by means of the conformations of the holders.

12 Claims, 8 Drawing Sheets

(51) Int. Cl.
*H01G 11/76* (2013.01)
*H01G 2/04* (2006.01)
*H01G 2/02* (2006.01)

(52) U.S. Cl.
CPC ............... *H01G 2/02* (2013.01); *Y02E 60/13* (2013.01); *Y02T 10/7022* (2013.01)

(56) References Cited

U.S. PATENT DOCUMENTS

| | | | | |
|---|---|---|---|---|
| 7,630,181 | B2 * | 12/2009 | Wilk | H01G 9/008 320/167 |
| 8,748,025 | B2 * | 6/2014 | Ohta | H01M 2/1083 429/152 |
| 9,005,796 | B2 * | 4/2015 | Shishido | H01M 2/1072 180/68.5 |
| 2007/0026305 | A1 * | 2/2007 | Jeon | H01M 2/1077 429/159 |
| 2007/0253146 | A1 | 11/2007 | Inoue et al. | |
| 2010/0015512 | A1 | 1/2010 | Inoue et al. | |
| 2010/0053927 | A1 * | 3/2010 | Inoue | H01G 11/10 361/830 |
| 2011/0052957 | A1 | 3/2011 | Ohta | |

* cited by examiner

ENERGY ACCUMULATION BASKET

CROSS REFERENCE TO RELATED APPLICATIONS

This Application is a 371 of PCT/ES2014/070754 filed on Oct. 3, 2014, which, in turn, claimed the priority of Spanish Patent Application No. P201331452 filed on Oct. 3, 2013, both applications are incorporated herein by reference.

FIELD OF THE ART

The present invention relates to the devices of electric energy storage by means of using high-performance capacitors, proposing an energy storage basket that can be used in applications requiring an onboard energy accumulation system, such as transport vehicles (trains, trams, subways, buses and electric or hybrid cars, etc.), for example; nevertheless, the energy accumulation basket of the invention can be applied to any electrical installation requiring an electric energy accumulation system.

STATE OF THE ART

The reduction of transportation-related carbon emissions in the pursuit of a sustainable future has resulted in electric propulsion becoming one of the most efficient solutions for powering means of public transport, such as trams, trains, subways, buses, etc.

Usually, in the case of electrified urban or interurban transport, such as trams, electric power is supplied to drive equipment by means of an articulated system of rods located on the roof of the tram which takes current by contact with an overhead line (catenary). Cities have begun to reject these overhead lines due to the visual impact they have on the surrounding area, in addition to the high economic cost involved in their use as regards infrastructure.

In recent years, the technological development of capacitors has given rise to energy accumulators based on high-performance capacitors, commonly referred to as supercapacitors, which allow electric vehicles to travel autonomously through different route sections without needing to be connected to a catenary.

Spanish patent ES 2,372,454 belonging to the same applicant as the present invention discloses an energy accumulator of this type, formed by multiple high-performance capacitors connected to one another by their terminals through busbars. Capacitors are held by the upper portion of the energy accumulator through a supporting assembly formed by a holding plate and a perforated sheet, the terminals of the capacitors being screwed to the holding plate and the body of the capacitors being inserted into the perforated sheet, providing structural unity to the capacitor assembly.

Despite there being a de facto standard in the capacitor formatting and sizing, there can be certain width and height differences between capacitors from different manufacturers. These differences mean that capacitors do not properly fit in the energy accumulator, which can give rise to unwanted movements of capacitors and failures occurring in the connection between these capacitors while the railway vehicle is travelling. An energy accumulator that allows tightly housing capacitors of different sizes is therefore needed.

Patents US2007/253146 and US2010/015512 in turn propose energy accumulators including multiple capacitors incorporated between two cases into which they are inserted by their ends, there being arranged between the ends of the capacitors and the holders elastic elements which allow fitting capacitors of different lengths therein, held appropriately in the longitudinal direction, but neither of these cases provides a hold that allows adjusting the retention of the capacitors peripherally, such that capacitors of different diameters present lateral play which allows movement thereof.

Object of the Invention

According to the present invention, an energy accumulation basket is proposed to be applied in transport vehicles, although it can be applied in any electrical installation requiring an electric energy accumulation system. The energy accumulation basket of the invention allows tightly housing multiple capacitors, allowing the energy accumulation basket to be adapted to capacitors of different sizes, capacitors being suitably retained in the basket without experiencing unwanted movements while the vehicle of application is travelling.

The energy accumulation basket object of the invention incorporates multiple capacitors connected to one another by their terminals through busbars. The basket comprises holders provided with multiple housings in which the capacitors are arranged, said capacitors being held by their ends between holders. The walls of the housings have indentations where respective accessory elastic projections are housed, whereby capacitors arranged in the housings fit within the perimeter.

Conformations are also defined on the outer face of each holder, said conformations protruding into the housings for supporting the corresponding end of the capacitor arranged in the housing, the capacitors being axially retained in the respective housings by means of said conformations of the holders. In addition, vertically projecting posts are defined on the inner face of each holder in order to connect the holders to one another, a gap being formed between holders by means of said posts, such that by means of selectively switching the posts the height of the energy accumulation basket can be adjusted in order to adapt it to capacitors of different heights.

According to one embodiment of the invention, the elastic projections whereby the capacitor fits within the perimeter of the housings holding them are wedge-shaped, such that the wedge-shaped elastic projections assure a fit of the capacitor in a direction that is substantially radial and substantially axial to the longitudinal axis of the capacitor. It has been envisaged that four elastic projections, arranged in two pairs of diametrically opposite indentations in the housing, are arranged in each housing. Each housing may also have three elastic projections located in respective indentations.

Besides making the capacitors arranged in the housings of the holders fit within the perimeter so that the energy accumulation basket can be adapted to capacitors from different manufacturers (i.e., a fit in a direction substantially radial to the longitudinal axis of the capacitor), the elastic projections also allow compensating for expansions in diameter and in height occurring in the casings of the capacitors due to vibrations and/or heat throughout the operational life of the basket.

Therefore, the elastic projections allow properly fitting the capacitors in the holders of the energy accumulation basket, assuring suitable contact between the connection terminal of the capacitor and its respective busbar, being able to use busbars of different thicknesses, assuring electrical contact between terminal and busbar at all times.

The energy accumulation basket is laterally and vertically scalable by means of selectively adding energy adjacent accumulation baskets. Therefore, in order to laterally connect energy accumulation baskets, notches are defined on the side faces of the holders forming the baskets in which intermediate parts connecting with the notches of a laterally adjacent energy accumulation basket are inserted.

In order to vertically connect energy accumulation baskets, outward projections are defined in the corners of the holders forming the baskets, vertically connecting with the projections of a vertically adjacent energy accumulation basket. Said projections of the holders define through holes, whereby axial retention is established with the projections of the vertically adjacent energy accumulation basket.

Through holes of some projections of the holders define axial projections for being inserted into through holes of other reciprocal projections of the holders of another vertically adjacent energy accumulation basket; and in addition, some projections of the holders have pegs for being inserted into respective recesses defined in reciprocal projections of another vertically adjacent energy accumulation basket.

The posts connecting holders forming each energy accumulation basket to one another are arranged such that they are inserted into openings of the holders, and each one is formed by two sections coupled to one another, said posts defining through holes for inserting clamping screws for retaining the assembly formed by the holders and the posts.

An energy accumulation basket is thus obtained having advantageous constructive and functional features and acquiring its own identity and preferred character for the function of application for which it is intended in relation to supplying power by means of high-performance capacitors.

DETAILED DESCRIPTION OF THE INVENTION

Figure 1:
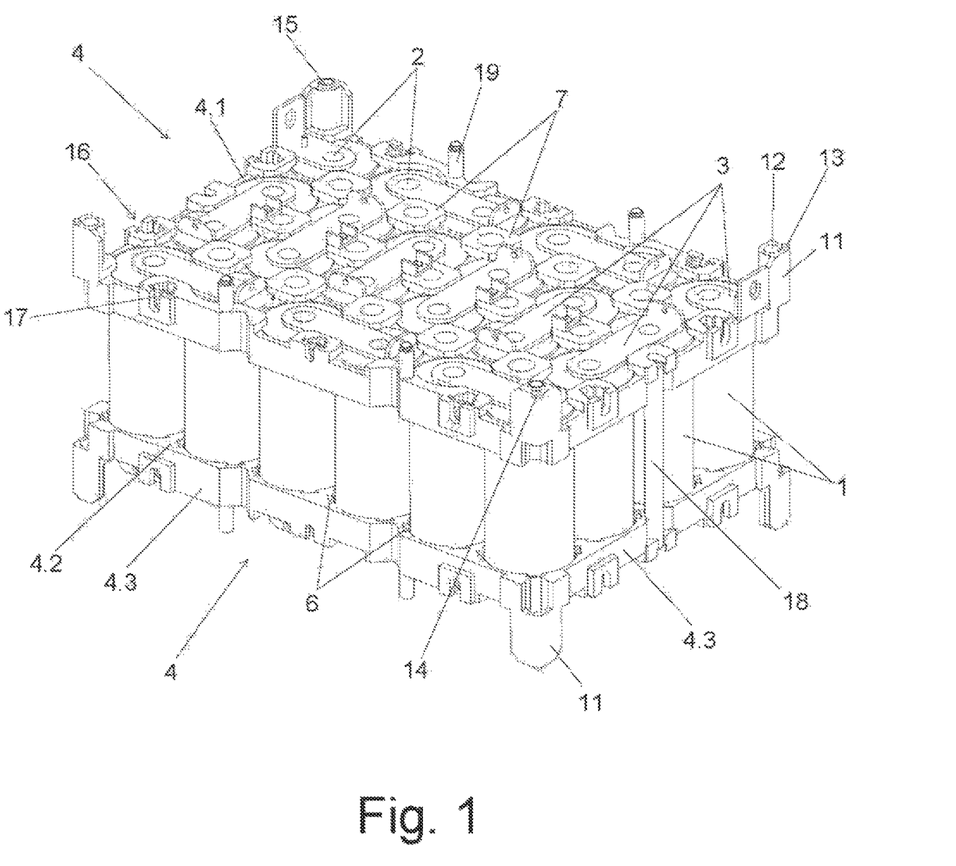
FIG. 1 shows a perspective view of the energy accumulation basket of the invention.
Figure 2:
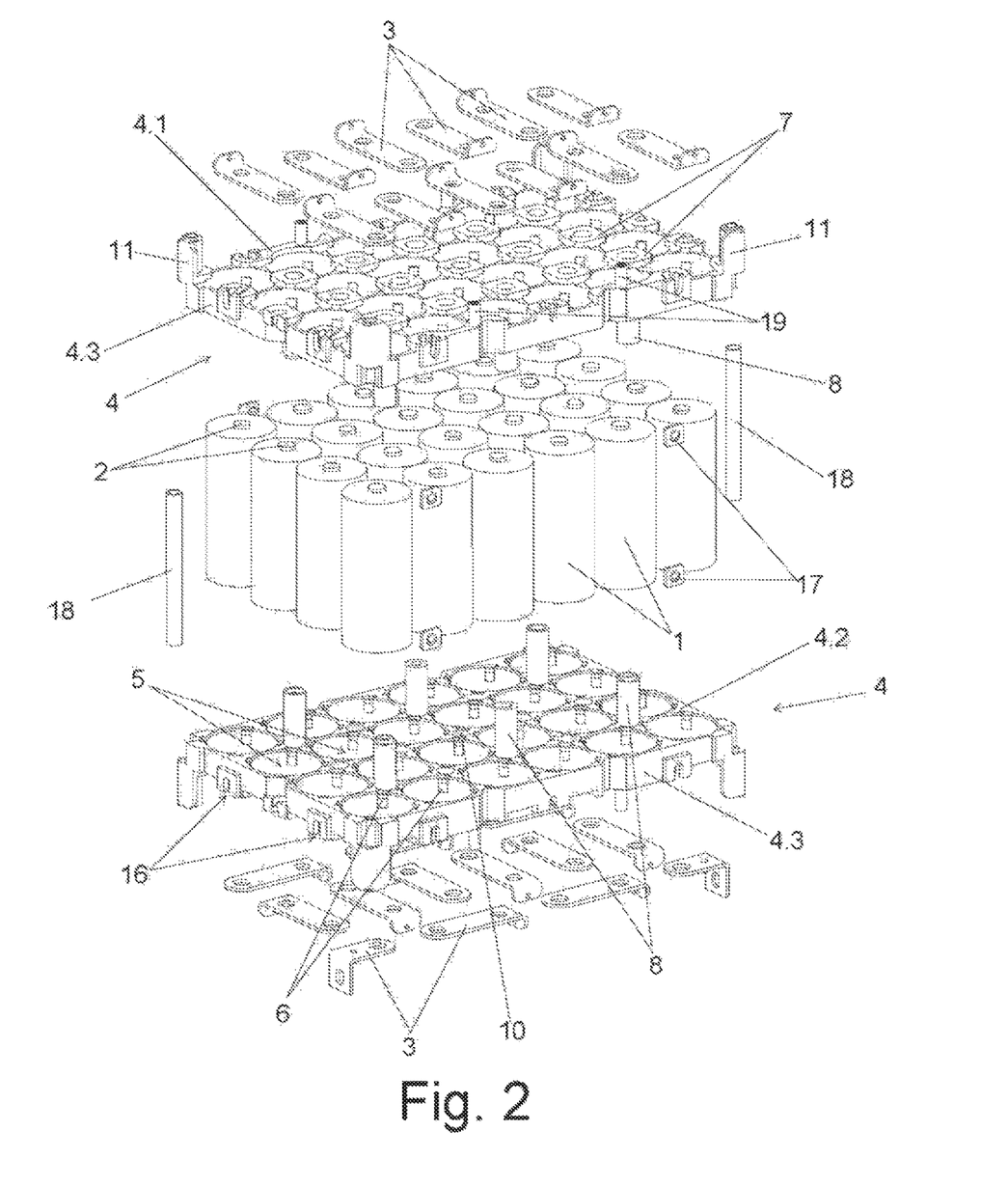
FIG. 2 shows an exploded perspective view of the different elements forming the energy accumulation basket.

FIG. 1 shows a perspective view of an embodiment of an energy accumulation basket according to the invention, the basket comprising multiple capacitors (1), the upper and lower ends of which have a respective connection terminal (2) so they can be connected through busbars (3). In the examples shown in the drawings, the capacitors (1) are cylindrical, high-performance (3000 Farads) double-layer capacitors, busbars (3) being arranged at both ends of said capacitors (1), however capacitors (1) of another type with different shapes and sizes can be used without altering the concept of the invention.

Figure 3:
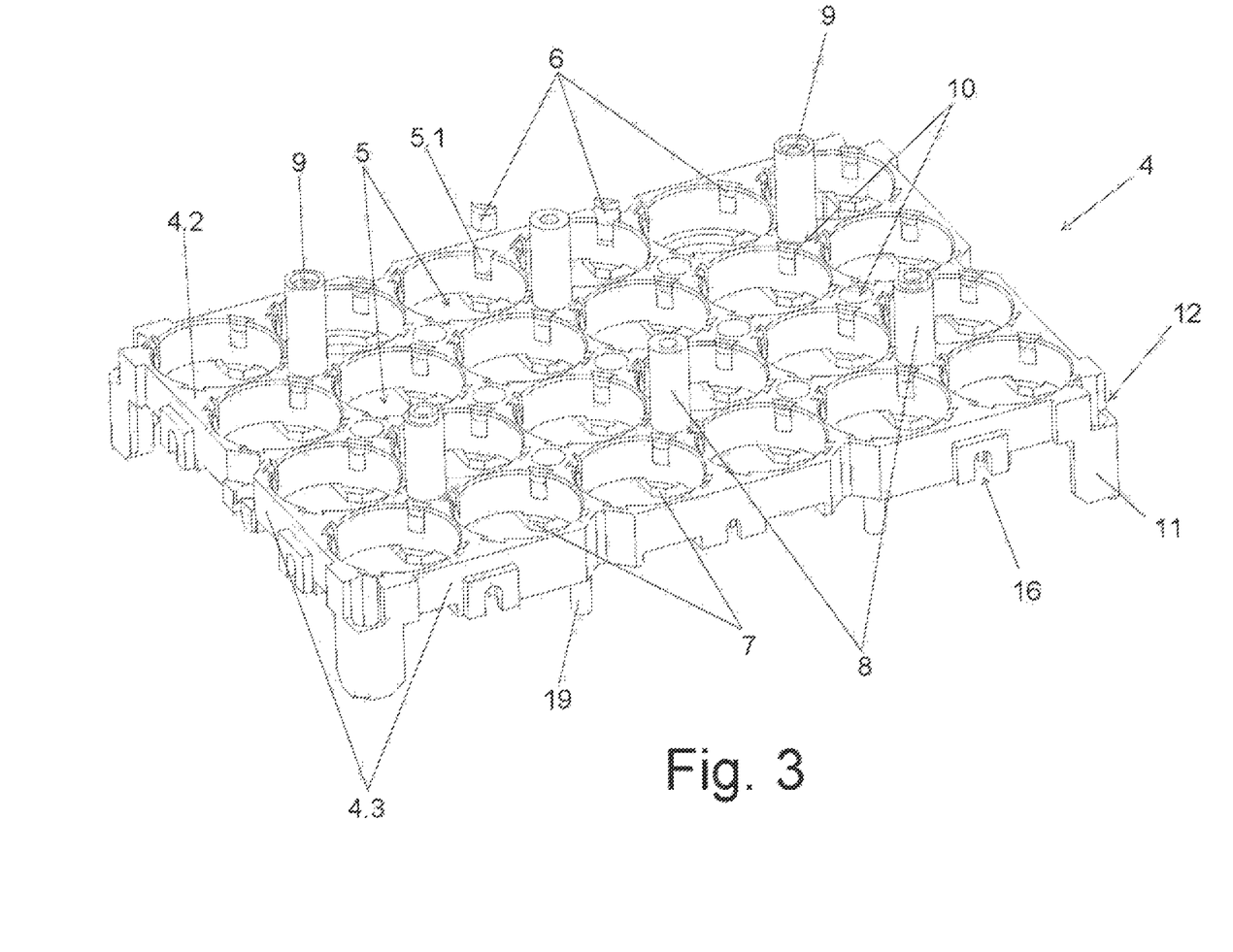
FIG. 3 shows a perspective view of one of the holders of the energy accumulation basket, with some of the elastic projections in a position in which they have been extracted from their position in the holder.

Capacitors (1) are arranged between two holders (4), each of said holders (4) having a plurality of housings (5) into which the ends of the capacitors (1) are inserted, such that each capacitor (1) is inserted at each end into a respective housing (5) of a holder (4). As can be seen in FIG. 3, each holder (4) has a substantially rectangular shape, with an outer face (4.1), an inner face (4.2) and side faces (4.3), such that capacitors (1) are retained between inner faces (4.2) of said holder (4).

Figure 4:
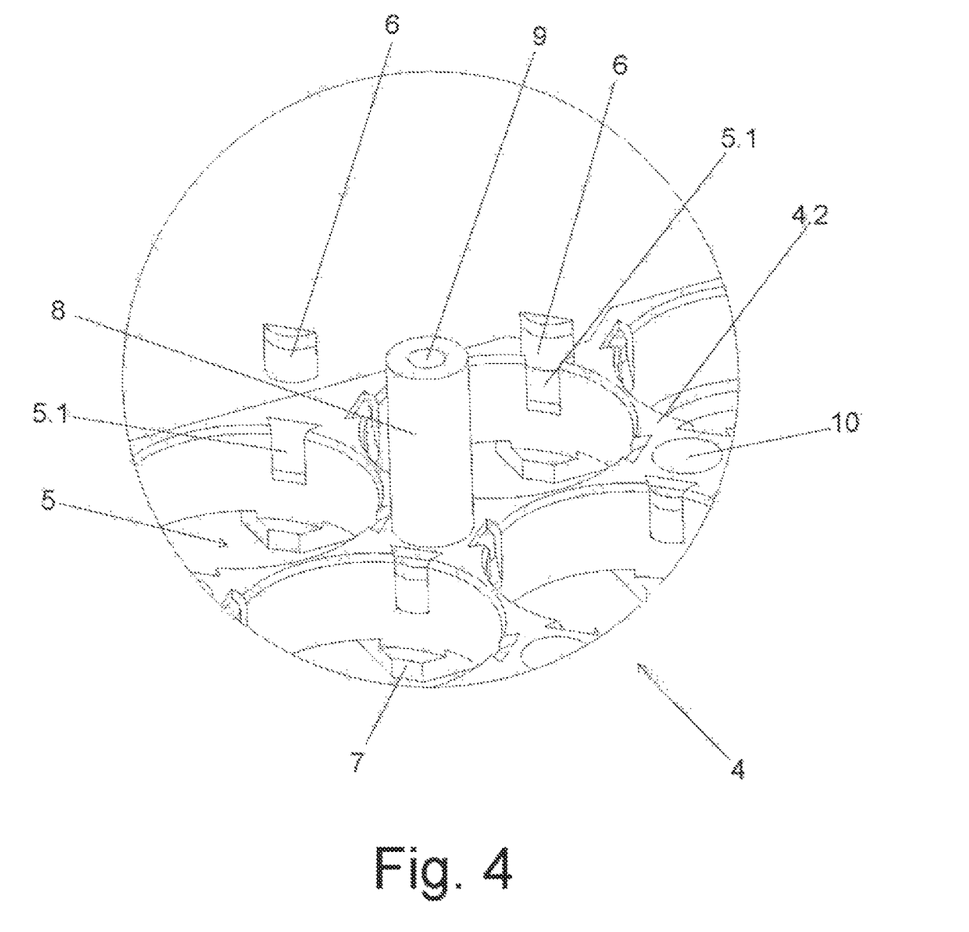
FIG. 4 shows an enlarged detail of the preceding figure.
Figure 5:
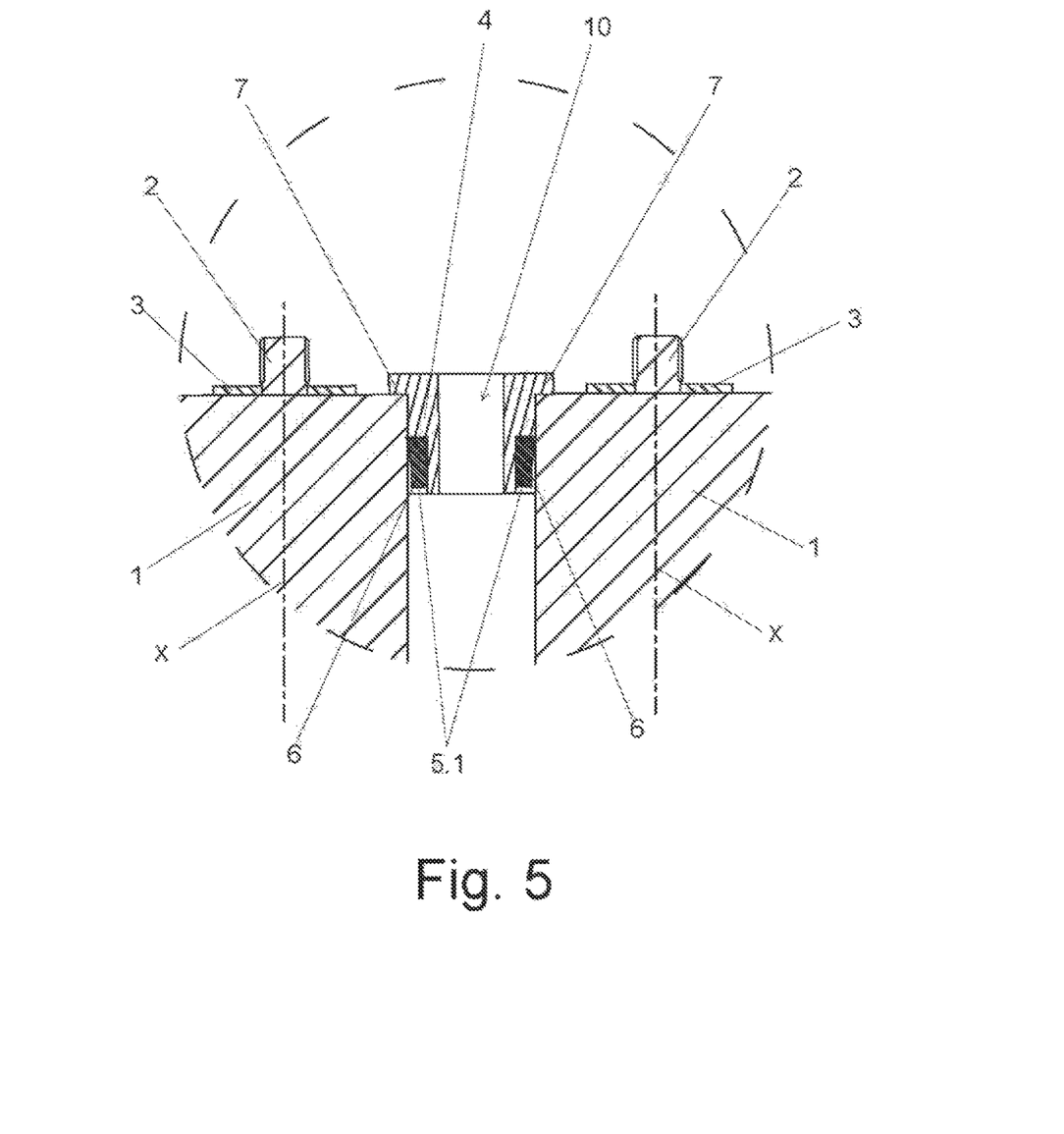
FIG. 5 shows an enlarged schematic detail of the housing arrangement of a capacitor in a holder of the energy accumulation basket object of the invention.

As can be seen in detail in FIGS. 4 and 5, each of the housings (5) of the holders (4) where the ends of the capacitors (1) are inserted incorporates elastic projections (6), whereby the outer contour of the capacitor (1) arranged in the housing (5) fits within the perimeter, therefore assuring that the capacitor (1) is suitably retained in the respective housing (5), preventing it from sliding or moving from one side to the other, and this fit within the perimeter also allows capacitors (1) of different widths to fit properly in the corresponding housings (5). The elastic projections (6) also allow absorbing expansions of the casings of the capacitors (1) occurring throughout the operational life of the basket due to vibrations and/or thermal changes in directions that are both radial and axial to the longitudinal axis (X) of the capacitor (1).

As can be seen in the embodiment shown in the drawings and in detail in FIG. 4, the elastic projections (6) have been envisaged to be wedge-shaped, such that in addition to the contour of the capacitor (1) fitting within the perimeter, the wedge shape of the elastic projections (6) allows the capacitors (1) to fit in a direction substantially axial to the longitudinal axis (X) of the capacitor (1). In the embodiments shown in the drawings, each housing (5) has four elastic wedges arranged in two pairs of indentations (5.1) made in the inner walls of the housing (5) in diametrically opposite positions, although three elastic wedges could also be arranged in each housing (5), or each housing (5) could even have a single annular elastic wedge arranged in a respective annular indentation (5.1) of the housing (5).

Conformations (7) are defined on the outer face (4.1) of each holder (4), said conformations (7) protruding into the housings (5). As can be seen in the cross-section view of FIG. 5, said conformations (7) are defined in the actual body of the holder (4), acting as a support base for the ends of the capacitors (1), such that the conformations (7) of each holder (4) axially retain capacitors (1) in the respective housings (5).

In addition, vertically projecting posts (8) are defined on the inner face (4.2) of each holder (4) in order to connect the inner faces (4.2) of the holders (4) forming the energy accumulation basket. Said posts (8) are arranged such that they are inserted into openings (10) located in areas of the holder (4) located between housings (5), each of the posts (8) being formed by two sections coupled to one another by means of a tongue and groove solution or by means of direct support. The posts (8) define through holes (9) therein for inserting retaining screws (not depicted) for axially retaining the assembly formed by sections of the posts (8) and the holders (4). It has been envisaged that each post (8) can be formed in a single part directly connecting holders (4) to one another, having a length similar to the height of the capacitors (1). In any case, the gap between holders (4) can be adjusted by means of selectively switching posts (8) of different lengths, which allows arranging capacitors (1) of different heights in the energy accumulation basket.

Figure 8:
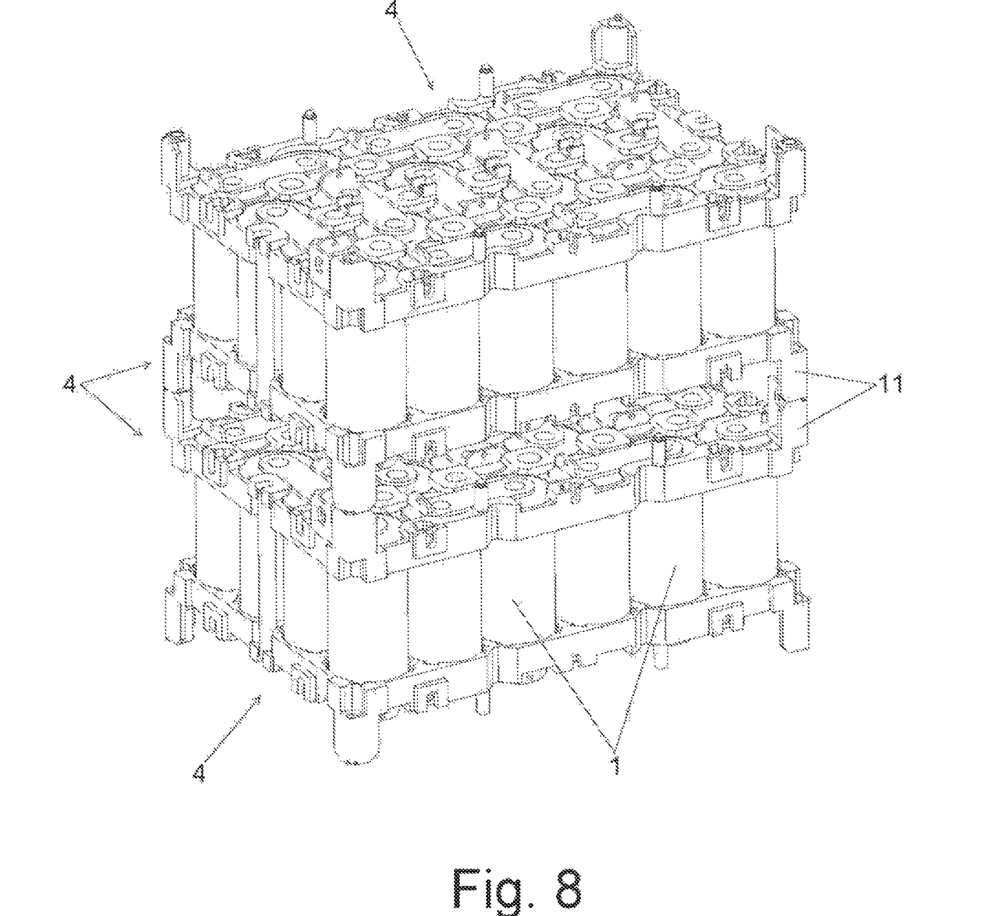
FIG. 8 shows two energy accumulation baskets arranged in a vertically adjacent manner.
Figure 9:
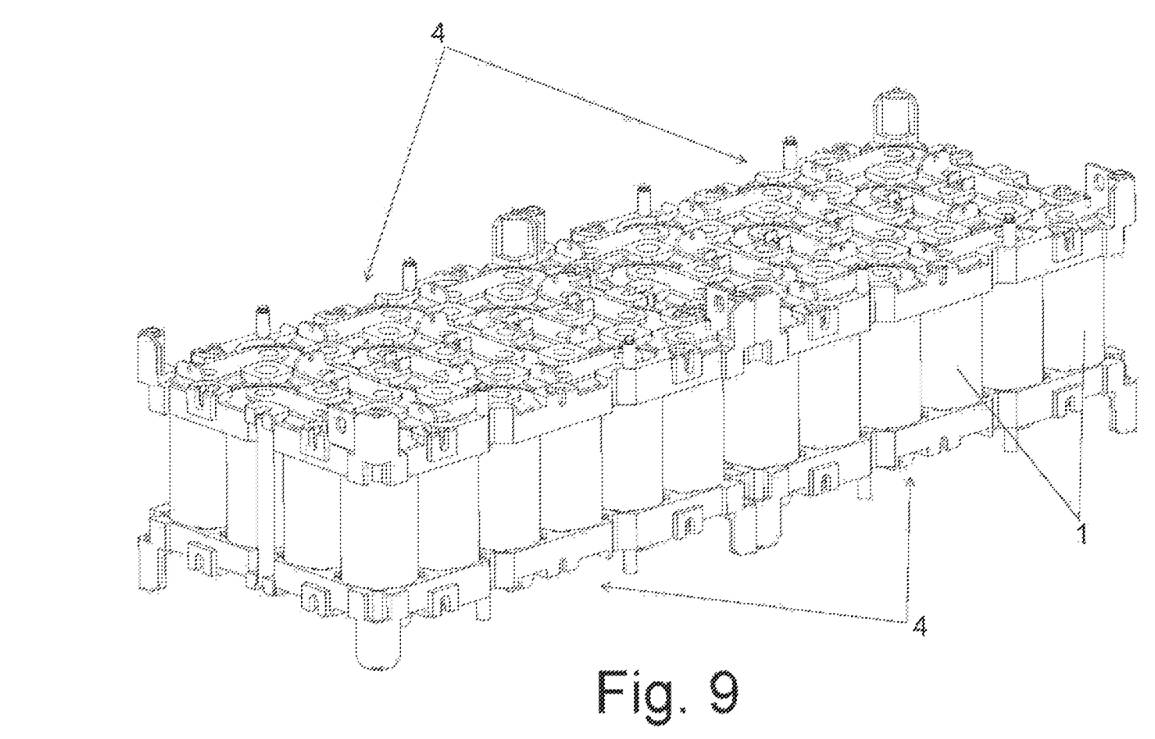
FIG. 9 shows two energy accumulation baskets arranged in a laterally adjacent manner.

As can be seen in FIGS. 8 and 9, the energy accumulation basket of the invention can be laterally and vertically extended by means of selectively adding other energy accumulation baskets arranged adjacent to a first energy accumulation basket.

The corners of holders (4) have outward projections (11) provided with through holes (12) in order to vertically connect energy accumulation baskets. Therefore, as can be seen in FIG. 8, the projections (11) of the upper holder (4) of an energy accumulation basket arranged in a lower position connect with projections (11) of the lower holder (4) of another energy accumulation basket arranged on the former, such that energy accumulation baskets arranged one on top of the other are attached to one another by means of inserting fixing screws into through holes (12) of corresponding projections (11).

Figure 6:
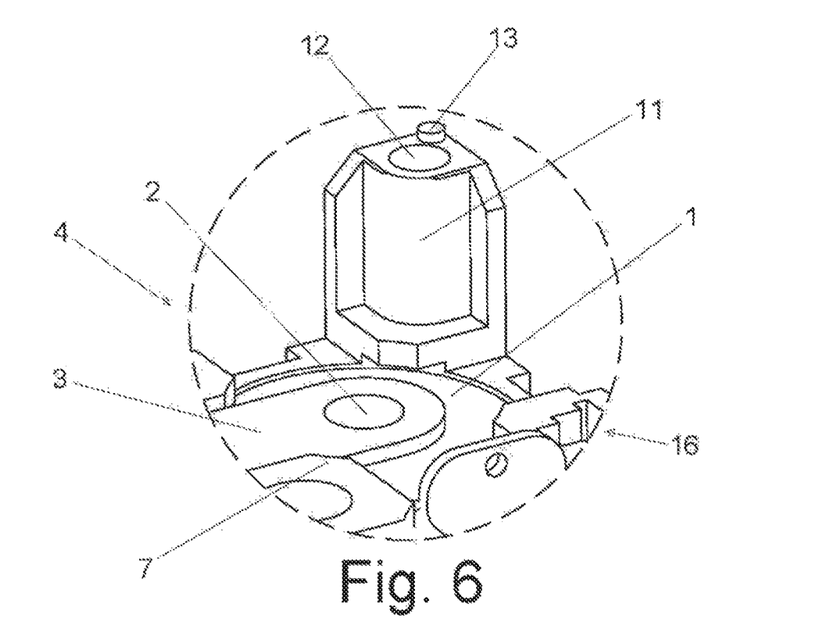
FIGS. 6 and 7 show an enlarged view of the projections of a holder of the energy accumulation basket which allow vertically connecting one energy accumulation basket with another.
Figure 7:
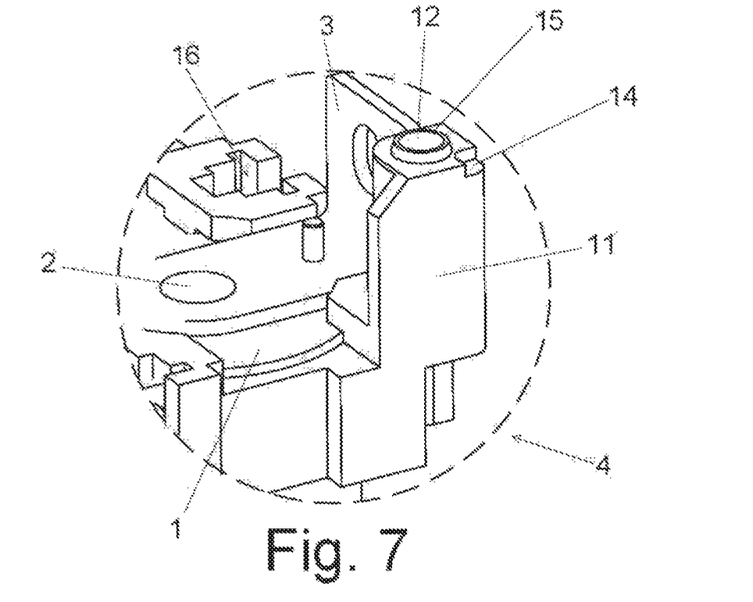

As can be seen in the details of FIGS. 6 and 7, the projections (11) have been envisaged to have two types of reciprocal configurations to assure proper connection of said projections (11) when two energy accumulation baskets are vertically connected, such that a holder (4) having four projections (11) has two projections (11) with a first configuration and the other two projections (11) with a second configuration; although all the projections (11) of a holder (4) could also have the first configuration and the projections (11) of the other holder (4) have the second configuration.

FIG. 6 shows a first configuration of projections (11), said projections (11) having a peg (13) for being inserted into a reciprocal recess (14) of a projection (11) having the second configuration (see FIG. 7), whereas projections (11) with the second configuration define an axial projection (15) for being inserted into the through hole (12) of other projections (11) having the first configuration. Immobility of holders (4) when they are connected to one another to vertically attach two energy accumulation baskets is thereby assured.

In addition, as illustrated in FIG. 9, to laterally connect two energy accumulation baskets notches (16) defined on side faces (4.3) of holders (4) have been envisaged where intermediate parts (17) are inserted, allowing the screwed attachment with intermediate parts (17) arranged in notches (16) of another energy accumulation basket arranged laterally adjacent to the first energy accumulation basket.

Vertical rods (18) arranged such that they are inserted between holders (4) are used to increase rigidity of the energy accumulation basket, two vertical rods (18), each one arranged at one end of the energy accumulation basket, being used. These vertical rods (18) have been envisaged to be internally hollow so as to allow the passage of cables therethrough.

The outer face (4.1) of holders (4) of the energy accumulation basket have a plurality of supports (19) used for supporting and fixing a control board (not depicted) of the capacitors (1) where all the electrical and control signals of the energy accumulation basket are sent.

The invention claimed is:

1. An energy accumulation basket, comprising holders provided with multiple housings where there are arranged capacitors held by their ends between the holders, each holder having a first side and a second side, the housings being disposed on the first side of each holder, wherein each housing comprises an inner wall defining a perimeter of a cavity adapted to receive an end of a respective capacitor, the inner wall have indentations where a plurality of elastic projections are housed, whereby capacitors arranged in the housings fit within the perimeter, and where a plurality of conformations are defined on the second side of each holder, said conformations protruding into the housings for supporting the end of the corresponding capacitor, the capacitors being axially retained in the respective housings by means of the conformations of the holders.

2. The energy accumulation basket according to claim 1, wherein the plurality of elastic projections are wedge-shaped.

3. The energy accumulation basket according to claim 1, wherein each housing comprises three elastic projections located in respective indentations of the inner wall of the housing.

4. The energy accumulation basket according to claim 1, wherein each housing comprises four elastic projections located in two pairs of diametrically opposite indentations.

5. The energy accumulation basket according to claim 1, wherein each holder comprises one or more side faces, wherein first notches are defined on the one or more side faces of the holders, wherein one or more intermediate parts are inserted into the first notches, the one or more intermediate parts being adapted to connect with second notches of a laterally adjacent energy accumulation basket.

6. The energy accumulation basket according to claim 1, wherein first outward projections are defined in one or more corners of the holders, the first outward projections being adapted to connect with second projections of a vertically adjacent energy accumulation basket.

7. The energy accumulation basket according to claim 6, wherein the projections of the holders define through holes, whereby axial retention is established with the projections of a vertically adjacent energy accumulation basket; through holes of some projections defining axial projections for being inserted into through holes of reciprocal projections of another vertically adjacent energy accumulation basket; whereas other projections have pegs for being inserted into respective recesses defined in reciprocal projections of a vertically adjacent energy accumulation basket.

8. The energy accumulation basket according to claim 1, wherein vertically projecting posts are defined on the first side of each of the first and second holders in order to connect the first and second holders to one another.

9. The energy accumulation basket according to claim 8, wherein the posts are arranged such that they are inserted into openings of the holders, and each one is formed by two sections coupled to one another, each post defining a through hole for inserting a clamping screw for axially clamping the assembly formed by the holders and the post.

10. The energy accumulation basket according to claim 1, wherein the outer face of the holders has supports for supporting a control board of the capacitors.

11. The energy accumulation basket according to claim 1, wherein vertical rods making the attachment of said holders rigid are arranged such that they are inserted between holders, said vertical rods being internally hollow so as to allow the passage of cables therethrough.

12. An energy accumulation basket, comprising:
first and second holders adapted to hold a plurality of capacitors, each of the first and second holders comprising:
a first side comprising a plurality of housings, wherein each housing in the first holder corresponds to a respective housing in the second holder, wherein each housing is adapted to hold an end of a respective capacitor, wherein each housing comprises:
an inner wall defining a cavity adapted to receive the end of the respective capacitor, the inner wall having a plurality of indentations; and a plurality of elastic projections disposed in the plurality of indentations, the plurality of elastic projections being adapted to retain the end of the respective capacitor in the housing; and a second side comprising a plurality of conformations, the plurality of conformations being separate from the plurality of elastic projections, each conformation covering at least a portion of the cavity of at least one housing, each conformation being adapted to support the end of the respective capacitor and to axially retain the respective capacitor in the at least one housing.

\* \* \* \* \*